United States Patent
Gregarek et al.

(10) Patent No.: US 9,697,456 B2
(45) Date of Patent: Jul. 4, 2017

(54) OPTICALLY VARIABLE SECURITY ELEMENT

(71) Applicant: GIESECKE & DEVRIENT GMBH, Munich (DE)

(72) Inventors: Andre Gregarek, Munich (DE); Michael Rahm, Bad Tolz (DE); Josef Schinabeck, Gmund (DE); Winfried Hoffmuller, Bad Tolz (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/787,646

(22) PCT Filed: Apr. 28, 2014

(86) PCT No.: PCT/EP2014/001129
§ 371 (c)(1),
(2) Date: Oct. 28, 2015

(87) PCT Pub. No.: WO2014/177267
PCT Pub. Date: Nov. 6, 2014

(65) Prior Publication Data
US 2016/0110638 A1    Apr. 21, 2016

(30) Foreign Application Priority Data
Apr. 29, 2013   (DE) .................. 10 2013 007 484

(51) Int. Cl.
*G06K 19/077* (2006.01)
*B42D 25/41* (2014.01)
(Continued)

(52) U.S. Cl.
CPC ....... *G06K 19/07722* (2013.01); *B42D 25/00* (2014.10); *B42D 25/342* (2014.10);
(Continued)

(58) Field of Classification Search
USPC ................................. 235/488, 380
See application file for complete search history.

(56) References Cited

U.S. PATENT DOCUMENTS

| 4,765,656 A | 8/1988 | Becker et al. |
| 8,094,376 B2 | 1/2012 | Schilling et al. |

(Continued)

FOREIGN PATENT DOCUMENTS

| CA | 2801794 C | 8/2015 |
| CN | 101952128 A | 1/2011 |

(Continued)

OTHER PUBLICATIONS

International Preliminary Report on Patentability for corresponding International PCT Application No. PCT/EP2014/001129, Nov. 3, 2015.

(Continued)

*Primary Examiner* — Allyson Trail
(74) *Attorney, Agent, or Firm* — Workman Nydegger (57) ABSTRACT

An optically variable security element, for security papers, value documents and other data carriers, includes a single or multilayer central body having opposing first and second main surfaces, an arrangement of microlenses on the first main surface of the central body, the microlenses having a refractive effect defining a focal plane, a laser-sensitive recording layer arranged on the second main surface of the central body, a mask layer arranged between the arrangement of microlenses and the laser-sensitive recording layer and outside of the focal plane of the microlenses, and a plurality of micromarks produced in the laser-sensitive recording layer by the action of laser radiation, each micromark being associated with a microlens and being visible when the security element is viewed through the associated (Continued)

microlens. The mask layer comprises a macroscopic gap region that is in register with the plurality of micromarks.

19 Claims, 4 Drawing Sheets

(51) Int. Cl.
*B42D 25/425* (2014.01)
*B42D 25/43* (2014.01)
*B42D 25/342* (2014.01)
*B42D 25/00* (2014.01)
B42D 25/324 (2014.01)
B42D 25/346 (2014.01)

(52) U.S. Cl.
CPC ........... *B42D 25/41* (2014.10); *B42D 25/425* (2014.10); *B42D 25/43* (2014.10); *B42D 25/324* (2014.10); *B42D 25/346* (2014.10); B42D 2033/10 (2013.01); B42D 2033/18 (2013.01); B42D 2033/22 (2013.01); B42D 2033/24 (2013.01); B42D 2035/20 (2013.01); B42D 2035/36 (2013.01); B42D 2035/44 (2013.01)

(56) References Cited

U.S. PATENT DOCUMENTS

| 8,632,100 | B2 | 1/2014 | Kaule et al. |
| 8,786,521 | B2 | 7/2014 | Kaule et al. |
| 9,007,669 | B2 | 4/2015 | Heim |
| 2006/0157559 | A1* | 7/2006 | Levy ...................... G06K 17/00 235/380 |
| 2007/0016790 | A1* | 1/2007 | Brundage .............. G07D 7/002 713/176 |
| 2010/0103527 | A1* | 4/2010 | Endle ....................... B44F 7/00 359/620 |
| 2010/0182221 | A1 | 7/2010 | Kaule et al. |
| 2010/0194532 | A1 | 8/2010 | Kaule |
| 2010/0277805 | A1 | 11/2010 | Schilling et al. |
| 2011/0007374 | A1 | 1/2011 | Heim |
| 2014/0175785 | A1 | 6/2014 | Kaule et al. |

FOREIGN PATENT DOCUMENTS

| CN | 103068584 A | 4/2013 |
| DE | 102006005000 A1 | 8/2007 |
| EP | 0219012 A2 | 4/1987 |
| EP | 1747905 A2 | 1/2007 |
| WO | 2009000528 A1 | 12/2008 |
| WO | 2010115235 A1 | 10/2010 |
| WO | 2011038848 A1 | 4/2011 |

OTHER PUBLICATIONS

International Search Report for corresponding International PCT Application No. PCT/EP2014/001129, Jul. 11, 2014.
Chinese Search Report from CN Application No. 2014800289950, Apr. 17, 2016.

* cited by examiner

OPTICALLY VARIABLE SECURITY ELEMENT

BACKGROUND

The present invention relates to an optically variable security element for security papers, value documents and other data carriers, a method for manufacturing such a security element, and a data carrier having such a security element.

For protection, data carriers, such as value or identification documents, but also other valuable objects, such as branded articles, are often provided with security elements that permit the authenticity of the data carrier to be verified, and that simultaneously serve as protection against unauthorized reproduction.

Security elements having viewing-angle-dependent effects play a special role in safeguarding authenticity, as these cannot be reproduced even with the most modern copiers. Here, the security elements are furnished with optically variable elements that, from different viewing angles, convey to the viewer a different image impression and, depending on the viewing angle, display for example another color or brightness impression and/or another graphic motif.

For example, identification cards, such as credit cards or personal identity cards, have long been personalized by means of laser engraving. In personalization by laser engraving, the optical properties of the substrate material are irreversibly changed through suitable guidance of a laser beam in the form of a desired marking Such a laser marking makes it possible to combine the individualization in the data carrier with security elements and to integrate them into the print image more freely than with conventional individualization, for example with known numbering methods.

Publication EP 0 219 012 A1 describes an identification card having a partial lens grid pattern. Through said lens pattern, pieces of information are inscribed in the card from different angles with a laser. Said pieces of information can subsequently also be perceived only from said angle, such that, when the card is tilted, the different pieces of information appear.

SUMMARY

Proceeding from this, the object of the present invention is to specify a security element of the kind cited above having an attractive visual appearance and high counterfeit security.

According to the present invention, a generic security element comprises
 a single or multilayer central body having opposing first and second main surfaces,
 an arrangement, arranged on the first main surface of the central body, of microlenses of the same kind whose refractive effect defines a focal plane,
 a laser-sensitive recording layer arranged on the second main surface of the central body,
 a mask layer that is arranged between the arrangement of microlenses and the laser-sensitive recording layer and outside of the focal plane of the microlenses, and
 a plurality of micromarks produced in the laser-sensitive recording layer by the action of laser radiation, each micromark being associated with a microlens and being visible when the security element is viewed through the associated microlens,
 the mask layer comprising a macroscopic gap region that is in register with the plurality of micromarks.

Lenses whose size is below the resolution limit of the naked eye are referred to as microlenses. The microlenses are preferably developed to be spherical or aspherical and advantageously have, for example in banknotes, a diameter between 5 µm and 100 µm, preferably between 10 µm and 50 µm, particularly preferably between 15 µm and 20 µm. In card applications, the microlenses can also be larger and have, for example, a diameter between 100 µm and 300 µm. In all designs, the microlenses can also be developed as cylindrical lenses. The curvature of the microlenses defines at least one focal length for each lens. Here, the microlenses of the microlens arrangement all have the same focal length and are thus "of the same kind" within the meaning of the present description. Through the identical focal length, it is ensured that the microlenses together define a common focal plane.

In some embodiments, in addition to the mentioned arrangement of microlenses of the same kind, also further microlens arrangements having other focal lengths can be provided.

A gap region that is perceptible with the naked eye from a viewing distance of 20 cm is referred to as a macroscopic gap region. The macroscopic gap region preferably has a dimension between 0.5 mm and 3 cm in every direction. Further, in all embodiments, the macroscopic gap region advantageously forms a motif in the form of patterns, characters or a code.

The specification that the macroscopic gap region is in register with the plurality of micromarks means that, from a normal viewing distance of 20 to 30 cm, the gap region and a marking region that closely surrounds the plurality of micromarks appear to be congruent. Here, the position of the marking region or of the micromarks in the plane of the recording layer can deviate from the position of the gap region in the plane of the mask layer by a multiple of the microlens diameter, depending on the direction of the laser impingement. Particularly preferably, the position of the marking region or of the micromarks in the plane of the recording layer deviates from the position of the gap region in the plane of the mask layer by at most half a microlens diameter.

The central body can be developed as a single layer and, for example, be formed by a foil, but it can also have a multilayer structure and comprise multiple foils and/or intermediate layers, such as laminating lacquer layers. The central body can, but does not have to, constitute a supporting substrate of the security element.

In an advantageous variant of the present invention, the mask layer is a laser-sensitive mask layer in which the gap region is produced by the action of laser radiation. Here, the gap region of the mask layer and the micromarks of the recording layer are advantageously produced in the same operation by the same laser beam to ensure the registration of the gap region and the micromarks.

In another, likewise advantageous variant of the present invention, the mask layer is a laser-absorbing or laser-reflecting mask layer that preferably constitutes a printing layer. In this variant, the mask layer itself is advantageously not laser-sensitive and is not altered by the laser radiation upon laser impingement for producing the micromarks.

The mask layer can especially be arranged on the first main surface of the central body between the central body and the arrangement of microlenses. In this case, the central body can be single- or multilayer. Alternatively, the central body can consist of two or more sub-layers, and the mask layer can be arranged between two sub-layers of the central body.

In an advantageous embodiment, the gap region of the mask layer extends continuously across multiple microlenses, preferably across several hundred microlenses, particularly preferably across several thousand microlenses.

In another, likewise advantageous embodiment, the gap region of the mask layer extends across multiple microlenses, preferably across several hundred microlenses, particularly preferably across several thousand microlenses, there being present between adjacent microlenses mask partitions whose dimensions lie below the resolution limit of the human eye. In particular, the width of the mask partitions between the microlenses lies below 15 µm, preferably below 10 µm or even below 5 µm.

The distance between adjacent micromarks is expediently equal to the distance between the microlenses associated with the adjacent micromarks.

The distance of the focal plane from the microlens plane defines a focal length, namely the focal length of the individual microlenses of the same kind. The distance of the mask layer from the focal plane can lie between 40% and 100% of the focal length. Advantageously, the distance of the mask layer from the focal plane is more than 80%, preferably more than 90% of the focal length.

According to a development of the present invention, the security element includes ablation-promoting patterns that facilitate the production of the gap region in the mask layer upon laser impingement. In particular, for this, the mask layer can comprise a surface-enlarging relief pattern, for example a surface-enlarging relief pattern having an intersecting sinusoidal surface topography. Here, the surface topography can have, for example, a height of 200 to 400 nm, preferably of about 300 nm, and in the x- and y-direction, a grating constant of 200 to 400 nm in each case, preferably of about 300 nm.

In a preferred embodiment, the first main surface of the central body is provided with the surface-enlarging relief pattern only in the gap region.

Further possibilities for the selective removal of metal layers by means of laser radiation are described in publication WO 2011/038848 A2, especially on pages 26 to 32, the disclosure of which is incorporated in the present description by reference. With reference to the present invention, here, the recording layer is designed in each case in such a way that it requires a higher laser energy for the demetalization, and the mask layer in such a way that a lower laser energy is sufficient for the demetalization. In this way, it can be achieved that, at a laser energy that produces micromarks of the desired size in the recording layer, the gap region of the more easily ablated mask layer is produced largely or completely without mask partitions. In this way, as complete as possible an ablation of the mask layer can be achieved in the gap regions with simultaneous controlled production of micromarks of the desired size in the recording layer.

According to a further inventive embodiment, a laser-absorption layer is arranged between the mask layer and the recording layer. The laser-absorption layer preferably has, in the visible spectral range, a transmission of more than 90% or even of more than 95%, and/or preferably has, in the infrared spectral range, an absorption of more than 20% or even of more than 30%.

The laser impingement for producing the gap region in the mask layer and the micromarks in the recording layer preferably occurs with an infrared laser, for example at a wavelength of 1.064 µm. Due to the laser-absorption layer, a part of the incident laser energy is absorbed, such that the mask layer is impinged on with the full laser energy, but the recording layer is impinged on with only reduced laser energy. In this way, the laser impingement can occur with a laser energy that is sufficient to ablate the mask layer also in the regions between the microlenses, without producing too-large micromarks in the recording layer or completely ablating the recording layer.

The provision of a laser-absorption layer can also be combined with the above-mentioned ablation-promoting measures for the mask layer to ensure a complete ablation of the mask layer in the gap region with simultaneous controlled production of micromarks of the desired size in the recording layer.

In a preferred embodiment, the micromarks are formed by microholes in the recording layer, especially by substantially circular microholes or by pattern-shaped microholes. The exact form of the micromarks or microholes depends especially on the form of the microlenses (spherical, aspherical, cylindrical) and, as described below, also on the angle of incidence of the laser radiation.

In other embodiments, instead of microholes in the recording layer, the micromarks can also consist in blackened or non-blackened changes in the visual appearance of the recording layer. In general, the micromarks can be formed by a color change or removal of the laser-sensitive recording layer. The removal of the laser-sensitive recording layer also includes an only partial removal, which, optically, corresponds to a lightening. The color change or removal of the recording layer can be based on thermal, photochemical or mixed processes. To produce transmitted light effects, the micromarks have a reduced opacity and, in the extreme case, are formed by the microholes mentioned. For reflected light effects, a reduced opacity is not absolutely mandatory, the change there can also consist, for example, in a blackening.

In an advantageous embodiment, the micromarks are smaller than the respective associated microlenses. Here, the area ratio of micromark and associated microlens can be below 1.0 or below 0.5, below 0.2, or even below 0.1. Circular microholes can, for example, have a diameter between 1 µm and 15 µm, between 1.5 µm and 5 µm, and especially between 2 µm and 3 µm.

The security element is particularly advantageously semi-transparent in the gap region of the mask layer and in the micromarks arranged in register therewith, especially having a transmittance between 20% and 90%. In any case, the transmittance of the security element in the gap region is significant, for example higher than outside of the gap region of the mask layer by more than a factor of 1.5 or by more than a factor of 2. In the last-named regions, the security element is typically opaque or has a transmittance of less than 15%, especially of less than 10%. This results in a conspicuous see-through effect, as described in greater detail below.

In some embodiments, the micromarks are introduced through the microlens arrangement into the recording layer from at least two different directions with laser radiation. When viewed later, the micromarks are then each perceptible substantially from the respective viewing directions from which they were introduced upon production. Accordingly, in these embodiments, the micromarks are perceptible from at least two different viewing directions, such that tilt or alternating images can be produced. The motifs that are visible from different viewing directions can be related in meaning and constitute, for example, an image sequence, as in a flip-book, that proceeds when the security element is tilted in front of the eye of the viewer.

In advantageous embodiments of the present invention, at the same time, the security element includes a micro-optical depiction arrangement, especially a moiré magnification arrangement, a moiré-type micro-optical magnification arrangement or a modulo magnification arrangement.

The basic principle of such micro-optical depiction arrangements is explained in publication WO 2009/000528 A1, the disclosure of which is incorporated in the present description by reference. In this case, the recording layer preferably includes, in addition to the micromarks, a motif image that is subdivided into a plurality of cells, in each of which are arranged depicted regions of a predetermined further motif, the microlens arrangement forming a microlens grid that, when the motif image is viewed, reconstructs the further motif from the depicted regions arranged in the cells.

In a preferred variant of the present invention, the recording layer, the mask layer or both layers are opaque. In particular, the recording layer and/or the mask layer can be formed by an opaque metal layer or include an opaque metal layer. Here, the term metal also includes metal alloys. Layers composed of, for example, aluminum, copper, chrome, silver, gold or an Al—Cu alloy may be used as opaque metal layers. In some designs, it is intended for there to be a color contrast between the mask layer and the recording layer. In this case, aluminum, for example, is chosen as the material for the mask layer, and copper as the material for the recording layer. In other designs, the mask layer and the recording layer are to appear to have the same color. In this case, the same material or materials of similar colors are chosen for both layers.

In addition to metal layers, for the mask layer and the recording layer, also thin-film elements having a color-shift effect may be used, which already lend the mask layer or the recording layer itself an optically variable appearance. Such thin-film elements typically consist of an absorber layer, a dielectric spacing layer and a metallic reflector layer. Here, the reflector layer is executed to be thin enough so that it can be provided with the desired gap region or microholes by the laser radiation.

In a further, likewise advantageous variant of the present invention, the recording layer, the mask layer or both layers are semitransparent, preferably each having a transmittance between 20% and 90%, especially between 40% and 80%.

The present invention further comprises a data carrier, especially a value document, such as a banknote, a passport, a certificate, an identification card or the like, that is furnished with a security element of the kind described. In an advantageous variant of the present invention, the security element can especially be arranged in or over a window region or a through opening in the data carrier.

The present invention further includes a method for manufacturing an optically variable security element for security papers, value documents and other data carriers, in which a single or multilayer central body having opposing first and second main surfaces is provided, there being arranged on the first main surface of the substrate an arrangement of microlenses of the same kind whose refractive effect defines a focal plane, a laser-sensitive recording layer is arranged on the second main surface of the substrate, a mask layer is arranged between the arrangement of microlenses and the laser-sensitive recording layer and outside of the focal plane of the microlenses, and the mask layer is developed having, or is provided with, a macroscopic gap region, a plurality of micromarks is produced in the laser-sensitive recording layer by the action of laser radiation that passes through the gap region of the mask layer, each micromark being associated with a microlens and being visible when the security element is viewed through the associated microlens, it being ensured through these manufacturing steps that the macroscopic gap region of the mask layer and the plurality of micromarks are arranged in register with each other.

In a preferred method variant, the macroscopic gap region in the mask layer and the micromarks in the laser-sensitive recording layer are produced in the same operation by the same laser beam.

In another, likewise preferred method variant, the mask layer having the gap region is applied to, especially imprinted on, the central body or a sub-layer of the central body to produce an exposure mask. The micromarks in the laser-sensitive recording layer are produced in a subsequent operation by impinging on the mask layer having the gap region with laser radiation.

In both method variants, the laser impingement preferably occurs with infrared radiation, especially an Nd:YAG, Nd:YVO$_4$ or fiber laser.

Further exemplary embodiments and advantages of the present invention are explained below by reference to the drawings, in which a depiction to scale and proportion was omitted in order to improve their clarity.

BRIEF DESCRIPTION OF THE DRAWINGS

Shown are.

DETAILED DESCRIPTION OF VARIOUS EMBODIMENTS

Figure 1:
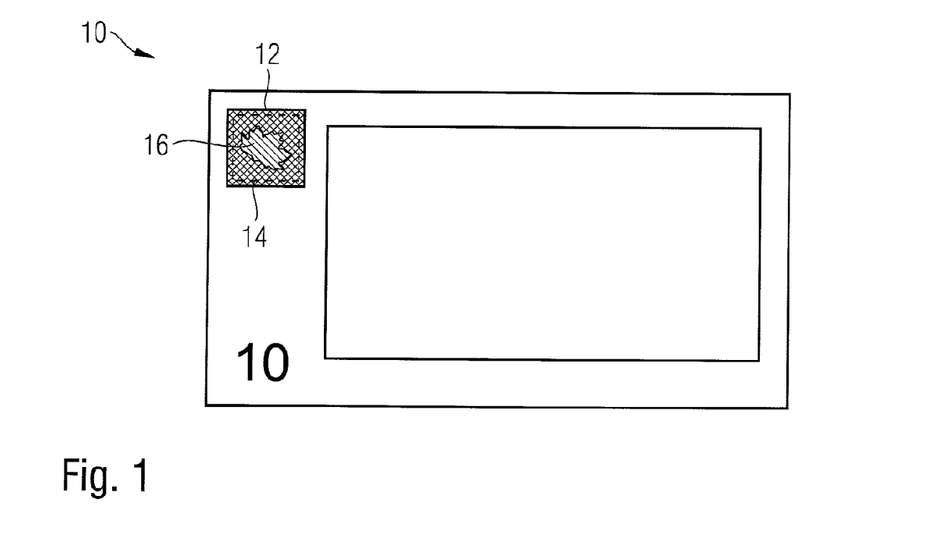
FIG. 1 a schematic diagram of a banknote having an inventive optically variable security element that is arranged over a through opening in the banknote, FIG. 2 schematically, the layer structure of a security element according to the present invention, in cross section, FIG. 3 in (a) and (b), two intermediate steps in the manufacture of the security element in FIG. 2, FIG. 4 the visual appearance of the security element in FIG. 2 when viewed from the front, in (a) in reflected light and in (b) in transmitted light, FIG. 5 the visual appearance of the security element in FIG. 2 when viewed from the reverse, in (a) in reflected light and in (b) in transmitted light, FIG. 6 schematically, the layer structure of a security element, in cross section, in which the mask layer is arranged in the interior of the central body, FIG. 7 schematically, the layer structure of a security element having a surface-enlarging relief pattern for the mask layer, in cross section, FIG. 8 schematically, the layer structure of a security element having a laser-absorption layer arranged in the interior of the central body, in cross section, and FIGS. 9 and 10 schematically, the layer structure of security elements, in cross section, in which the mask layer is formed by a laser-absorbing or laser-reflecting printing layer.

The present invention will now be explained using the example of security elements for banknotes. For this, FIG. 1 shows a schematic diagram of a banknote 10 having an inventive optically variable security element 12 that is arranged over a through opening 14 in the banknote 10. In transmitted light, the security element 12 appears semi-transparent in sub-regions 16 and, due to its application over the opening 14, can be viewed both from its front and from its reverse, in each case in reflected light and in transmitted light. From said different viewing directions, the security element 12 displays, in each case, different visual appearances, as explained in greater detail below.

Figure 2:
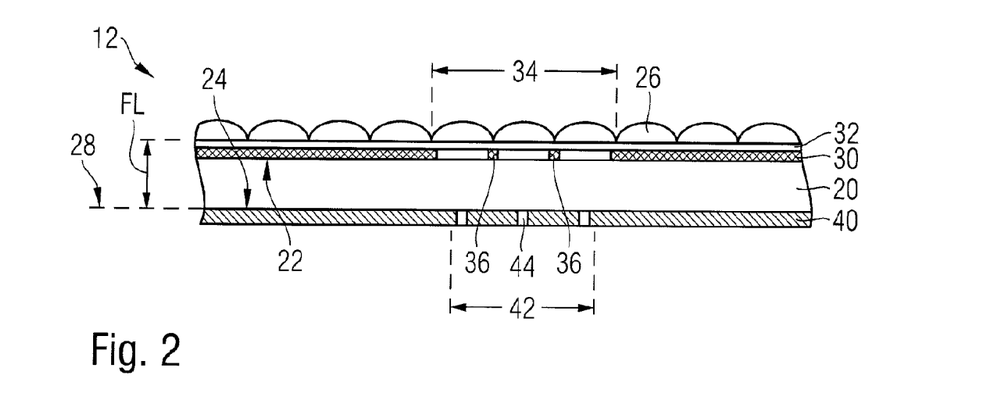

FIG. 2 shows, schematically, the layer structure of the security element 12 according to the present invention, in cross section, with only the portions of the layer structure that are required to explain the functional principle being depicted. The security element 12 includes a transparent central body 20 that is formed, for example, by a transparent plastic foil, such as a 27 µm thick polyethylene terephthalate (PET) foil. In the exemplary embodiment shown, the central body 20 is single-layer, but can also be two- or multilayer, as explained in greater detail below.

The central body 20 comprises opposing first and second main surfaces 22, 24, the first main surface 22 being provided with a mask layer 30, an adhesion-promoter layer 32 arranged on the mask layer 30, and an arrangement of microlenses 26 of the same kind present on the adhesion-promoter layer 32. In the special exemplary embodiment, the microlenses 26 are arranged regularly in the form of a microlens grid and form on the surface of the substrate foil a two-dimensional Bravais lattice having a prechosen symmetry. The Bravais lattice of the microlenses 26 can have, for example, a hexagonal lattice symmetry or also a lower symmetry, such as the symmetry of a parallelogram lattice.

The microlenses 26, designed spherically in the exemplary embodiment, preferably have a diameter between 15 µm and 30 µm, for example of 20 µm, and are thus not perceptible with the naked eye. The thickness of the central body 20 and any intermediate layers and the curvature of the microlenses 26 are coordinated with each other in such a way that the focal length of the microlenses 26 of the same kind substantially corresponds to the distance of the arrangement of microlenses from the second main surface 24 of the central body 20. Since the microlenses 26 all have the same focal length and are thus "of the same kind" within the meaning of the present description, the refractive effect of the microlenses 26 defines a focal plane 28 that lies at a distance of one focal length FL from the arrangement of microlenses or the microlens plane and parallel to the plane of the microlenses 26. Due to the coordination of the curvature of the microlenses 26 and the thickness of the central body 20 and any intermediate layers present, the focal plane 28 normally coincides with the second main surface 24 of the central body 20, as also depicted in FIG. 2.

In the exemplary embodiment, the mask layer 30 arranged between the arrangement of microlenses 26 and the central body 20 consists of a laser-sensitive aluminum layer having a thickness of 40 nm. The mask layer 30 lies in the interior of the security element 12, but far outside of the focal plane 28 of the microlenses 26.

Through the action of laser radiation was produced in the mask layer 30 a macroscopic, in other words visible with the naked eye, gap region 34 that forms a motif in the form of patterns, characters or a code. Here, the macroscopic gap region 34, which normally has dimensions of multiple millimeters, extends across several thousand or even several tens of thousands of microlenses 26. As explained in greater detail below, as a result of the manufacturing process, there are present within the gap region 34, in the regions between adjacent microlenses, small mask partitions 36 whose dimensions, however, lie far below the resolution limit of the human eye and that thus do not or hardly appear for a viewer.

The security element 12 described with reference to FIGS. 1 to 5 displays, for illustration, a macroscopic gap region 34 having the form of a maple leaf 16 (FIG. 1). The gap region 34 has, for example, an area of 50 mm$^2$, such that, for a lens diameter of 20 µm, it extends across more than 100,000 microlenses. Here, the width of the mask partitions 36 is only a few micrometers, such that the overall impression of the gap region 34 is not or is hardly influenced by the mask partitions 36.

For the typical dimensions mentioned, it is understood that the proportions of the microlenses and the gap regions in the figures are depicted only schematically.

On the second main surface 24 of the central body 20 is arranged a laser-sensitive recording layer 40 that, in the exemplary embodiment, is formed by a 60 nm thick copper layer.

A plurality of circular microholes 44 having a diameter of 2 µm to 3 µm was introduced into the recording layer 40 by the action of laser radiation in a marking region 42. Even if the present invention is explained in greater detail in the following with reference to microholes, it is understood that, instead of microholes, also other micromarks can be used, such as color-altered regions in an ink layer.

The gap region 34 in the mask layer 30 and the microholes 44 lying on the opposing main surface of the central body 20 are produced in the manner described in greater detail below in the same operation, simultaneously and by the same laser beam, such that the gap region 34 and the microholes 44 have no registration tolerances for each other. As a result, the plurality of microholes in the recording layer 40 or the marking region 42 surrounding said microholes, is in register with the gap region 34 of the mask layer 30. In particular, the position of the marking region 42 in the plane of the recording layer 40 deviates, depending on the direction of the laser impingement, by at most half a lens diameter of the microlenses 26 from the position of the gap region 34 in the plane of the mask layer 30.

The approach according to the present invention thus permits, on the one hand, a highly precise alignment of the gap region 34 and the marking region 42 or microholes 44 with each other. On the other hand, the inventive arrangement of the mask layer 30 below the microlens arrangement and thus in the interior of the security element offers the advantage that, without any further protective measures, the mask layer 30 is excellently protected against external influences, such as soiling or wear.

Figure 3A:
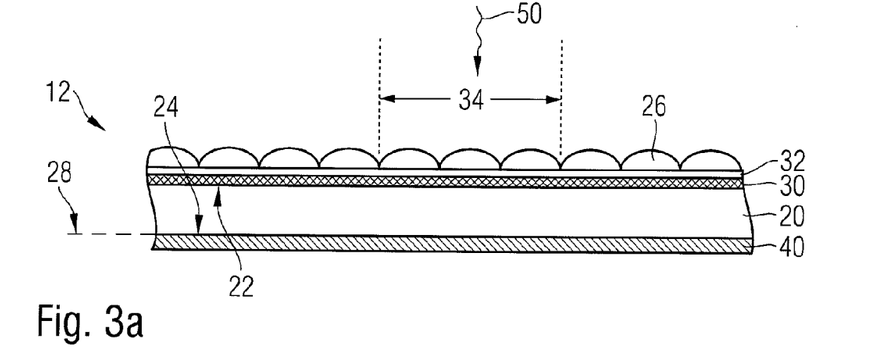

With reference to FIG. 3(*a*), for manufacturing the security element 12, a PET foil that forms the central body 20 is first coated on its first main surface 22 with a continuous, 40 nm thick aluminum layer 30. After the application of an adhesion-promoter layer 32, a UV lacquer layer is applied and embossed to produce the arrangement of microlenses 26. As mentioned above, the curvature of the microlenses 26 is chosen such that the focal length of the microlenses 26 substantially corresponds to the thickness of the layer sequence composed of the central body 20, the mask layer 30 and the adhesion-promoter layer 32. The focal plane 28 of the microlenses 26 then lies on the second main surface 24 of the central body. Said second main surface 24 is coated with a continuous, 60 nm thick copper layer 40. In the case of the layer thicknesses mentioned, both the aluminum layer 30 and the copper layer 40 are opaque. In the first instance, the opaque aluminum coating 30 lying far in front of the focal plane 28 prevents light from being focused on the recording layer 40 by the microlenses 26.

The central body 20 prepared and coated in this way is then impinged on from the side of the microlenses 16 or of the first main surface 22 with laser radiation 50, for example with the infrared radiation of a Nd:YAG, Nd:YVO$_4$ or fiber laser, and the aluminum layer 30 ablated in the form of the desired gap regions 34 by suitable guidance of the laser beam. Here, the laser beam 50 can be prefocused. Due to the ablation of the aluminum layer 30, the light-blocking effect of the mask layer 30 in the gap region 34 is canceled, and the focusing of the microlenses 26 on the recording layer 40 restored.

Figure 3B:
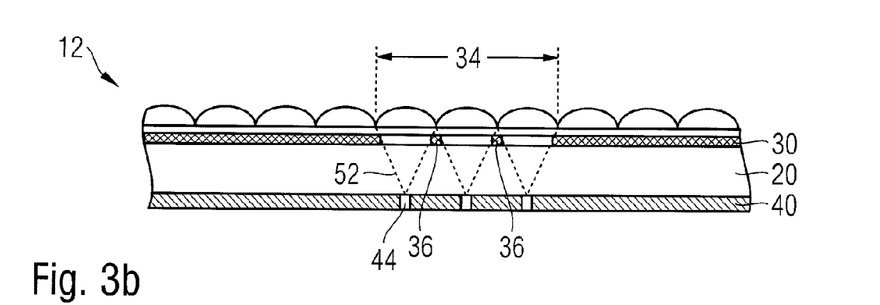

Now, if, for the laser impingement 50, a laser energy is used that is higher than the energy required for demetalizing the aluminum layer 30, then, after the ablation, a residual energy remains that is now focused unobstructed on the recording layer 40 by the microlenses 26, as indicated in FIG. 3(b) by the reference sign 52. Given a suitable choice of the laser energy, the residual energy is not so high that the recording layer 40 below the microlenses 26 is completely ablated, but is sufficient to produce in the recording layer 40 microholes 44 whose dimensions are smaller than those of the associated microlenses 26.

Through this approach it is achieved that there is associated with each of the microholes 44 a microlens 26 through which the microhole 44 is produced upon laser impingement, and through which the microhole 44 is visible when the security element is later viewed. The plurality of microholes 44 forms a marking region 42 that closely surrounds said plurality of microholes and that, due to the simultaneous production by the same laser beam, is in register with the gap region 34 of the mask layer 30. Due to the small dimensions of the microlenses 26 of only 20 μm, it is ensured that, from the normal viewing distance of 20 to 30 cm, the gap region 34 is congruent with the marking region 42 of the plurality of microholes 44.

Due to the focusing effect of the microlenses 26, upon laser impingement, the local laser energy in the mask layer 30 is substantially lower in regions between adjacent microlenses than in the regions that lie directly below the microlenses 26. Thus, within the gap region 34, depending on the laser energy used and the distance of the mask layer 30 from the microlens plane, small, non-demetalized mask partitions 36 can remain in the regions between adjacent microlenses 26. However, due to the small size and high areal coverage of the microlenses, the dimensions of the mask partitions lie well below the resolution limit of the human eye and are thus not or are hardly perceptible as such for a viewer. Especially when viewed obliquely, however, the mask partitions 36 can lead to a somewhat reduced transparency of the security element in the gap region 34, such that, for highly transparent gap regions, mask partitions that are as narrow as possible, or even no mask partitions, should be present.

Figure 4A:
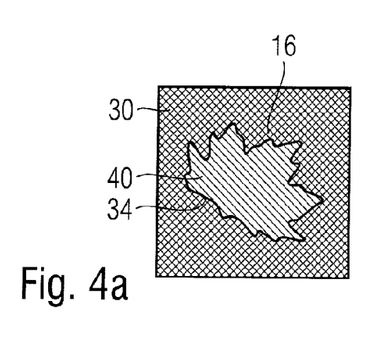
Figures 4B, 5B:
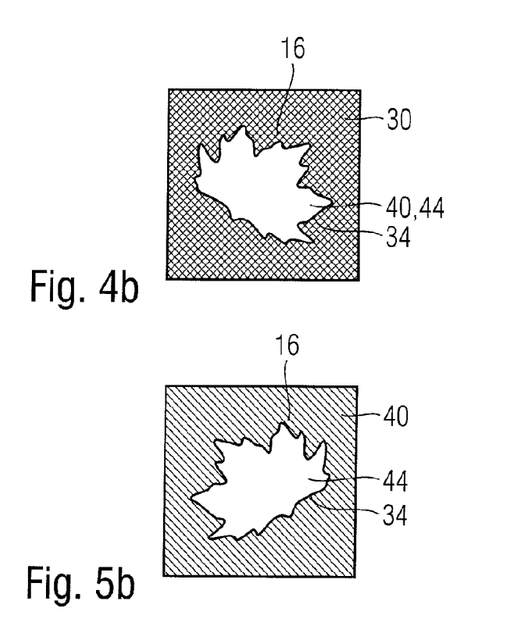

FIG. 4 shows the visual appearance of the security element 12 produced in this way, when viewed from the side of the first main surface 22 (front), FIG. 4(a) showing the appearance in reflected light, that is, in reflection, and FIG. 4(b) the appearance in transmitted light, that is, in transmission.

In reflected light, outside of the gap region 34, the silvery shining mask layer 30 composed of aluminum dominates the appearance. In the gap region 34, the mask layer 30 is completely removed, with the exception of any mask partitions 36, and the viewer sees there the copper color of the recording layer 40. Due to their small size, in reflected light, the microholes 44 in the recording layer 40 are perceptible with the naked eye only with difficulty or not at all, such that the recording layer 40 appears as a continuous metal layer.

Thus, in reflected light, the viewer sees a copper-colored maple leaf 16 against a silver-colored background, as illustrated in FIG. 4(a).

When viewed in transmitted light, due to the opaque mask layer 30, the security element 12 appears dark outside of the gap region 34. In the interior of the gap region 34, in contrast, the recording layer 40 is viewing-direction-dependently semi-transparent due to the plurality of microholes 44. Since, in said viewing direction, the microholes 44 are viewed through the microlenses 26, the microholes 44 are each perceptible substantially from that viewing angle from which they were introduced with the laser beam 50 upon production. Furthermore, around said central viewing angle, the microholes 44 are perceptible within a certain angle range that depends mainly on the diameter of the microholes 44. Said angle range results, in turn, especially from the lens properties, above all from the focal length of the microlenses 26 at the laser wavelength, the thickness of the central body 20 and any intermediate layers between the microlenses and the recording layer, the laser energy used, and the layer thickness of the recording layer 40. Through suitable choice and coordination of said parameters, it is possible to adjust the diameter of the microholes 44, and thus the angular size of the visibility region, as desired within a wide range.

With reference to the depiction in FIG. 4(b), the microholes 44 of the described exemplary embodiment were produced under vertical incidence of the laser radiation 50, as shown in FIG. 3. The microholes 44 are thus visible also when the security element 12 is viewed vertically through the microlenses 26, such that the gap region 34 appears semitransparent from this viewing angle in transmitted light. The viewer then sees a brightly shining maple leaf 16 against a dark background, as illustrated in FIG. 4(b).

Figure 5A:
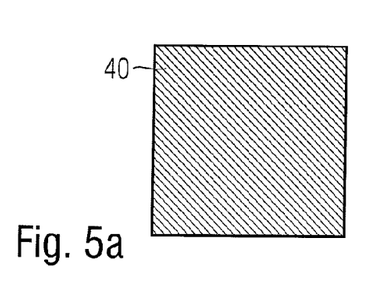

FIG. 5 shows the visual appearance of the security element 12 when viewed from the side of the second main surface 24 (reverse), FIG. 5(a) illustrating the appearance in reflected light and FIG. 5(b) the appearance in transmitted light.

In reflected light, from the reverse, only the copper-colored recording layer 40 is visible since, in reflected light, due to their small size, the microholes 44 are perceptible with the naked eye only with difficulty or not at all. The viewer thus sees, in reflected light from the reverse, the continuous copper-colored metal layer, as shown in FIG. 5(a).

When viewed in transmitted light, outside of the gap region 34, the security element 12 appears dark due to the opaque recording layer 40. In the interior of the gap region 34, in contrast, due to the plurality of microholes 44, the recording layer 40 appears semitransparent in a large angle range. In contrast to the view from the front, when the reverse is viewed, the microholes 44 are not viewed through microlenses 26. Rather, the microlenses 26 collect the light incident from the first main surface 22 and focus it on the microholes 44, such that a wide angle range results from which the microholes 44 on the reverse appear bright. The viewer thus sees a brightly shining maple leaf 16 against a dark background, as illustrated in FIG. 5(b).

In the exemplary embodiment just described, for the sake of simpler depiction, the microholes were introduced into the recording layer from only a single direction, namely from a direction vertical to the main surfaces 22, 24. In other designs, microholes or general micromarks can, however, also be produced in the recording layer 40 through the arrangement of microlenses 26 from two or more different directions, and the produced microholes or micromarks are then, when viewed later, visible from the corresponding viewing directions.

Figure 6:
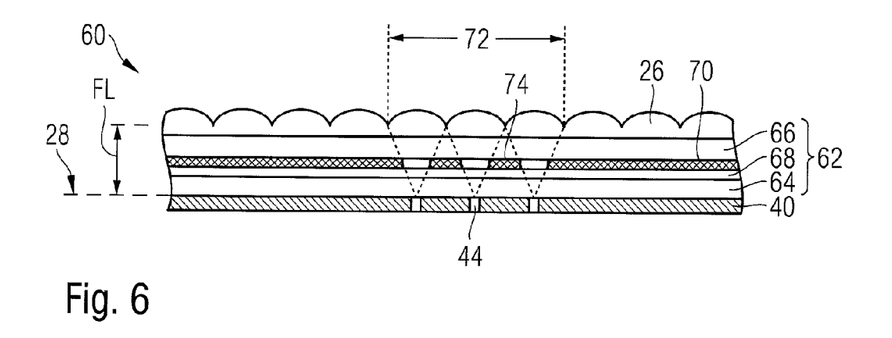

The mask layer need not be arranged on the first main surface of the central body, but rather can also be present in the interior of the central body, as illustrated in the exemplary embodiment in FIG. 6. The security element 60 shown there includes a multilayer central body 62 that comprises two transparent, 15 μm or 12 μm thick PET foils 64, 66 and a transparent laminating lacquer layer 68. As in the exemplary embodiment in FIG. 2, a first main surface 22 of the central body 62 is provided with an arrangement of microlenses 26 of the same kind, and on the second main surface 24, a laser-sensitive recording layer 40 in the form of a 60 nm thick chrome layer is provided. The curvature of the microlenses 26, in turn, is based on the thickness of the central body 62 in such a way that the focal plane 28 of the microlenses 26 coincides with the second main surface 24 and thus substantially also with the plane of the recording layer 40.

In this exemplary embodiment, the laser-sensitive mask layer 70 is arranged between the two foils 64, 66 of the central body 62 such that the distance of the mask layer 70 from the focal plane 28 is about 50% to 60% of the focal length FL of the microlenses.

Analogously to the approach described for FIG. 3, a macroscopic gap region 72 in the form of a desired motif was produced in the mask layer 70 by the action of laser radiation, with small mask partitions 74 having dimensions significantly below the resolution limit of the human eye being able here, too, to remain between adjacent microlenses within the gap region 72. The laser energy upon laser impingement was chosen such that, after the gap region 72 is produced in the mask layer 70, a residual energy remains that, after focusing by the microlenses 26, is sufficient for producing the microholes 44 in the recording layer 40. The marking region 42 being created in this way and having the plurality of microholes is in register with the gap region 72 of the mask layer 70 due to the simultaneous production by the same laser beam, as described for FIG. 3.

To facilitate the production of the gap region in the mask layer upon laser impingement, and thus especially to reduce or completely suppress mask partitions remaining, the security element can comprise ablation-promoting patterns, for example a surface-enlarging relief pattern for the mask layer. When a metal layer is vapor deposited on relief patterns of differing coarseness, this results, namely, principally in a metal layer that is all the thinner the coarser the relief is developed to be. Furthermore, in a coarser patterning, in general, incident laser radiation is reflected more often and thus gives off more energy to the metalization, such that, overall, coarser relief patterns can already be demetalized with lower laser energy.

Figure 7:
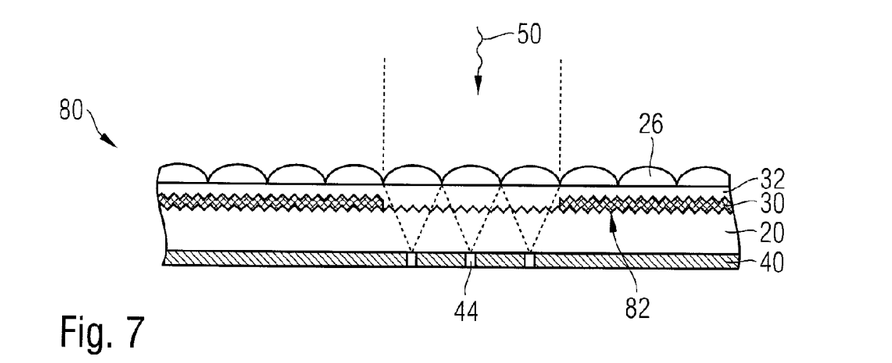

With reference to FIG. 7, the security element 80 shown there largely corresponds to the security element 12 in FIG. 2, wherein, however, the first main surface 22 of the central body 20 was provided with a surface-enlarging relief pattern 82 before the application of the mask layer 30 composed of aluminum. The surface-enlarging relief pattern 82 can, for example, be embossed in the surface of a foil, or can be present in an applied and embossed embossing lacquer layer. As depicted in FIG. 7, the surface-enlarging relief pattern 82 continues in the only 40 nm thick aluminum layer 30.

The second main surface 24 of the central body 20, in contrast, is developed to be flat, without a relief pattern. Due to the surface-enlarging patterning of the mask layer 30, said layer is ablatable with lower laser energy, while for the recording layer 40, no ablation-promoting measures were taken. The laser impingement 50 can thus occur with a laser energy that is sufficient to ablate the mask layer 30, also in the regions between the microlenses 26, without, in the process, producing too-large microholes 44 in the recording layer 40 that is harder to ablate, or entirely ablating the recording layer 40.

According to an embodiment not shown here, the first main surface 22 of the central body 20 can, prior to the application of the mask layer 30, be provided only in the gap region with the surface-enlarging relief pattern 82 that, in this case, serves as a mask. This has the advantage that the laser impingement need not occur in the shape of the desired gap region, since the gap region is already specified by the surface-enlarging relief pattern 82.

Figure 8:
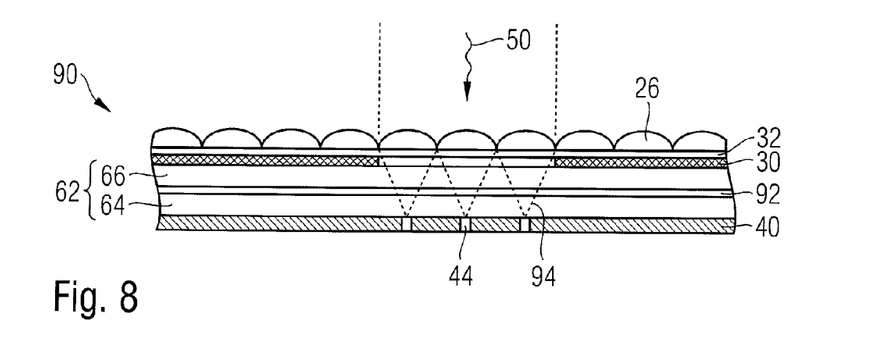

In a further invention variant that is explained with reference to the security element 90 in FIG. 8, a laser-absorption layer 92 that is transparent in the visible spectral range is arranged between the mask layer 30 and the recording layer 40 in the interior of the central body 62. Upon the laser impingement 50 with an infrared laser, for example of the above-mentioned Nd:YAG laser of a wavelength of 1.064 μm, the laser-absorption layer 92 absorbs a portion of the incident laser energy, such that the recording layer 40 is impinged on only with reduced laser energy 94. In this way, the laser impingement 50 can occur with a laser energy that is sufficient to ablate the mask layer 30 also in the regions between the microlenses 26 without, in the process, producing too-large microholes 44 in the recording layer 40 or ablating the recording layer 40 entirely.

In the visible spectral range, the laser-absorption layer 92 preferably has a transmission of more than 90% or even more than 95% and thus does not impair the visual appearance of the security element. The laser-absorption layer 92 can be formed, for example, by a lacquer layer to which an infrared absorber has been added and that is transparent in the visible spectral range. The central body 62 can also be formed by two transparent foils 64, 66 that are laminated together with a laminating adhesive that is transparent in the visible and to which an infrared absorber has been added, such that the laminating adhesive acts as a laser-absorption layer 92. Additionally or alternatively, also the transparent foil 64 can be developed as a laser-absorption layer and, for this, include, for example, an infrared absorber.

Figure 9:
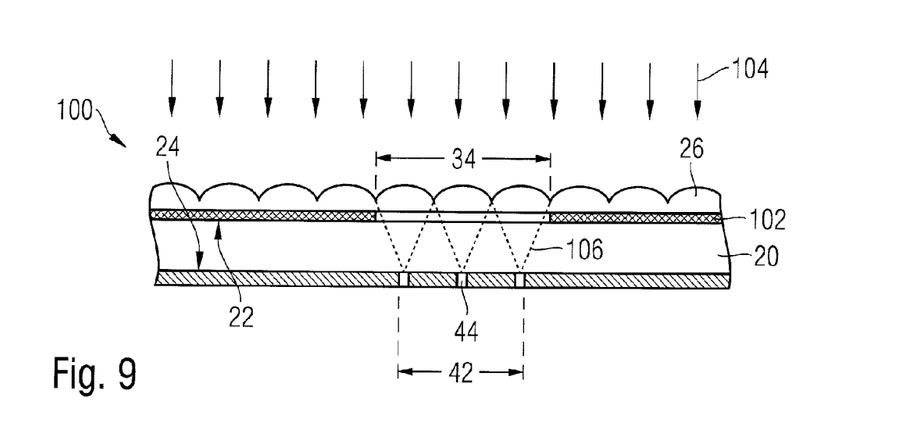

FIG. 9 shows a security element 100 according to another exemplary embodiment of the present invention, in which the mask layer 102 applied to the first main surface 22 of the central body 20 is formed by a laser-absorbing or laser-reflecting printing layer. For this, the mask layer 102 is imprinted on with a macroscopic gap region 34 in the form of a thin ink layer, for example a thin opaque white layer in the shape of the desired motif, on the first main surface 22. After the imprinting of the mask layer 102, a UV lacquer layer is applied and embossed to produce the arrangement of microlenses 26. The second main surface 24 of the central body is provided with a recording layer 40, for example composed of copper or chrome, as described above.

In the gap region 34, the mask layer 102 is transmissive for the laser radiation 104 of the subsequent laser impingement for producing the microholes 44. Within the gap region 34, the incident laser radiation is thus focused on the recording layer 40, as indicated by the reference sign 106, and produces the desired microholes 44 there. Outside of the gap region 34, in contrast, the incident laser radiation is absorbed or reflected, such that no microholes are produced in the recording layer 40 there. The mask layer 102 itself is advantageously not laser-sensitive and is thus not modified by the laser radiation 106 at the laser energies used.

In this approach, the patterning of the mask layer and the production of the microholes occur not in one, but in two separate work steps. This results in the advantage that the laser impingement 106 need not occur in the shape of the desired gap region 34, since the gap region 34 is already specified by the imprinted mask layer 102. In this embodiment, as a matter of principle, no mask partitions remain in the regions between the microlenses 26. Upon the subsequent laser impingement, the mask layer 102 acts as an exposure mask, such that microholes 44 are produced only in the gap region 34 of the mask layer 102. Thus, here, too, the gap region 34 and the plurality of microholes 44, or the marking region 42 surrounding said microholes, are in register with each other. Moreover, the mask layer 102 is well protected against external influences, such as soiling or wear, by its arrangement in the interior of the security element 100.

Figure 10:
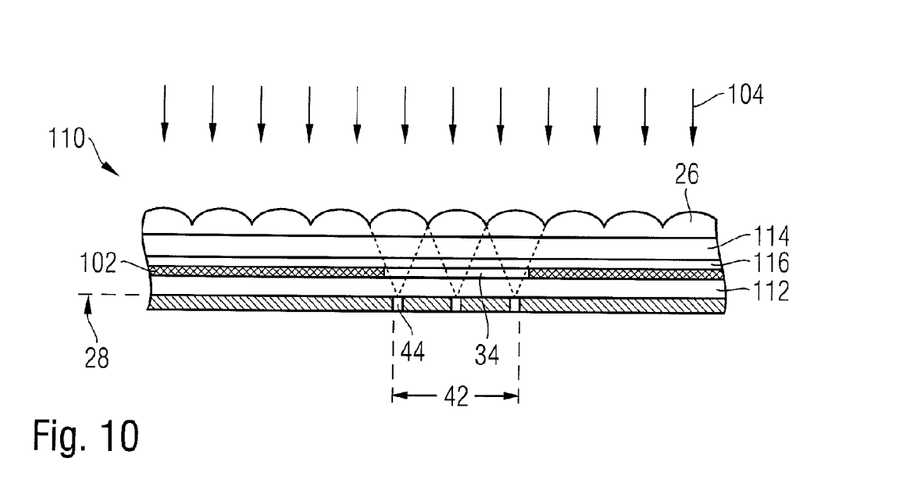

A laser-absorbing or laser-reflecting printing layer as the mask layer 102 can also be arranged relatively close to the focal plane of the microlenses 26. With reference to the security element 110 in FIG. 10, a mask layer 102, for example, can be imprinted on with a gap region 34 on a thin first foil 112. Then, the coated first foil 112 is laminated together with a thicker second foil 114 with a laminating adhesive 116, such that the mask layer 102 comes to lie between the two foils. Thereafter, the main surfaces of the central body 20 created in this way are provided in the above-described manner with an arrangement of microlenses 26 and a recording layer 40. Upon the impingement with laser radiation 104, the mask layer 102 acts as an exposure mask, such that microholes 44 are produced only in the gap region 34 of the mask layer 102. The gap region 34 and the plurality of microholes 44, or the marking region 42 surrounding said microholes, are thus in register with each other, and moreover, the mask layer 102 is well protected against external influences, such as soiling or wear, by its arrangement in the interior of the security element 110. In this exemplary embodiment, the distance of the mask layer 102 from the focal plane 28 is about 15% to 30% of the focal length FL of the microlenses.

LIST OF REFERENCE SIGNS

10 Banknote
12 Security element
14 Opening
16 Sub-regions
20 Central body
22, 24 Main surfaces
26 Microlenses
28 Focal plane
30 Mask layer
32 Adhesion-promoter layer
34 Gap region
36 Mask partitions
40 Recording layer
42 Marking region
44 Microholes
50 Laser radiation
52 Focused laser radiation
60 Security element
62 Central body
64, 66 Foils
68 Laminating lacquer layer
70 Mask layer
72 Gap region
74 Mask partitions
80 Security element
82 Surface-enlarging relief pattern
90 Security element
92 Laser-absorption layer
94 Low-level laser radiation
100 Security element
102 Mask layer
104 Laser radiation
106 Focused laser radiation
110 Security element
112, 114 First and second foil
116 Laminating adhesive

The invention claimed is:

1. An optically variable security element for security papers, value documents and other data carriers, comprising:
   a single or multilayer central body having opposing first and second main surfaces;
   an arrangement, arranged on the first main surface of the central body, of microlenses of the same kind whose refractive effect defines a focal plane;
   a laser-sensitive recording layer arranged on the second main surface of the central body,
   a mask layer that is arranged between the arrangement of microlenses and the laser-sensitive recording layer and outside of the focal plane of the microlenses, and
   a plurality of micromarks produced in the laser-sensitive recording layer by the action of laser radiation, each micromark being associated with a microlens and being visible when the security element is viewed through the associated microlens,
   the mask layer comprising a macroscopic gap region that is in register with the plurality of micromarks.

2. The security element according to claim 1, wherein the mask layer is a laser-sensitive mask layer in which the gap region is produced by the action of laser radiation.

3. The security element according to claim 1, wherein the mask layer is a laser-absorbing or laser-reflecting mask layer constituting a printing layer.

4. The security element according to claim 1, wherein the mask layer is arranged on the first main surface of the central body between the central body and the arrangement of microlenses.

5. The security element according to claim 1, wherein the central body consists of two or more sub-layers and the mask layer is arranged between two sub-layers of the central body.

6. The security element according to claim 1, wherein the gap region of the mask layer extends continuously across multiple microlenses.

7. The security element according to claim 1, wherein the gap region of the mask layer extends across multiple microlenses, there being present between adjacent microlenses mask partitions whose dimensions lie below the resolution limit of the human eye.

8. The security element according to claim 1, wherein the distance between adjacent micromarks is equal to the distance between the microlenses associated with the adjacent micromarks.

9. The security element according to claim 1, wherein the distance of the focal plane from a microlens plane defines a focal length, and the distance of the mask layer from the focal plane lies between 40% and 100% of the focal length.

10. The security element according to claim 1, wherein the mask layer comprises a surface-enlarging relief pattern.

11. The security element according to claim 1, wherein between the mask layer and the recording layer is arranged a laser-absorption layer that, in the visible spectral range has a transmission of more than 90%, and/or that, in the infrared spectral range, has an absorption of more than 20%.

12. The security element according to claim 1, wherein the micromarks are formed by microholes in the recording layer, by substantially circular microholes or by pattern-shaped microholes.

13. The security element according to claim 1, wherein the micromarks are each smaller than the associated microlenses, in that the area ratio of micromarks and associated microlenses lies below 1.0.

14. The security element according to claim 1, wherein the micromarks are introduced through the arrangement of microlenses into the recording layer from at least two different directions with laser radiation, and are perceptible when viewed from a respective one of said at least two different directions.

15. A data carrier having a security element according to claim 1.

16. The data carrier according to claim 15, wherein the security element is arranged in or over a window region or a through opening in the data carrier.

17. A method for manufacturing an optically variable security element for security papers, value documents and other data carriers, in which:
a single or multilayer central body having opposing first and second main surfaces is provided, there being arranged on the first main surface of the substrate an arrangement of microlenses of the same kind whose refractive effect defines a focal plane;
a laser-sensitive recording layer is arranged on the second main surface of the substrate;
a mask layer is arranged between the arrangement of microlenses and the laser-sensitive recording layer and outside of the focal plane of the microlenses; and
the mask layer is developed having, or is provided with, a macroscopic gap region,
a plurality of micromarks is produced in the laser-sensitive recording layer by the action of laser radiation that passes through the gap region of the mask layer, each micromark being associated with a microlens and being visible when the security element is viewed through the associated microlens;
it being ensured through these manufacturing steps that the macroscopic gap region of the mask layer and the plurality of micromarks are arranged in register with each other.

18. The method according to claim 17, wherein the macroscopic gap region in the mask layer and the micromarks in the laser-sensitive recording layer are produced in the same operation by the same laser beam.

19. The method according to claim 17, wherein the mask layer having the gap region is imprinted on, the central body or a sub-layer of the central body to produce an exposure mask, and in that the micromarks in the laser-sensitive recording layer are produced in a subsequent operation by impinging on the mask layer having the gap region with laser radiation.

* * * * *